United States Patent
Seong et al.

(10) Patent No.: US 11,011,777 B2
(45) Date of Patent: May 18, 2021

(54) NITROGEN-DOPED SULFIDE-BASED SOLID ELECTROLYTE FOR ALL-SOLID BATTERIES

(71) Applicants: Hyundai Motor Company, Seoul (KR); Kia Motors Corporation, Seoul (KR); Industry-University Cooperation Foundation Hanyang University, Seoul (KR)

(72) Inventors: Ju Yeong Seong, Gyeonggi-do (KR); Yong Jun Jang, Gyeonggi-do (KR); Hong Seok Min, Gyeonggi-do (KR); Sa Heum Kim, Gyeonggi-do (KR); Yong Sub Yoon, Seoul (KR); Pil Gun Oh, Seoul (KR); Dong Wook Shin, Gyeonggi-do (KR); Chan Hwi Park, Seoul (KR); Jin Oh Son, Gyeonggi-do (KR)

(73) Assignees: Hyundai Motor Company, Seoul (KR); Kia Motors Corporation, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 128 days.

(21) Appl. No.: 16/163,247

(22) Filed: Oct. 17, 2018

(65) Prior Publication Data
US 2019/0198917 A1    Jun. 27, 2019

(30) Foreign Application Priority Data
Dec. 27, 2017  (KR) .......... 10-2017-0181114

(51) Int. Cl.
*H01M 10/0562* (2010.01)
*C01B 25/14* (2006.01)
(Continued)

(52) U.S. Cl.
CPC ......... *H01M 10/0562* (2013.01); *C01B 25/10* (2013.01); *C01B 25/14* (2013.01);
(Continued)

(58) Field of Classification Search
CPC .......... H01M 10/0562; H01M 10/052; H01M 2220/20; H01M 2300/008; C01B 25/10;
(Continued)

(56) References Cited

U.S. PATENT DOCUMENTS

2017/0222257 A1* 8/2017 Miyashita ............... H01B 1/06

FOREIGN PATENT DOCUMENTS

CN    103560267 A  *  2/2014
WO    2016-009768 A1    1/2016

OTHER PUBLICATIONS

EPO machine generated English translation of CN-103560267-A (Year: 2014).*

(Continued)

*Primary Examiner* — Christopher P Domone
*Assistant Examiner* — Kimberly Wyluda
(74) *Attorney, Agent, or Firm* — Mintz Levin Cohn Ferris Glovsky and Popeo, P.C.; Peter F. Corless

(57) ABSTRACT

The present invention relates to a nitrogen-doped sulfide-based solid electrolyte for all-solid batteries. The a nitrogen-doped sulfide-based solid electrolyte for all-solid batteries includes a compound with an argyrodite-type crystal structure represented by the following Formula 1:

$Li_aPS_bN_cX_d$    [Formula 1]

wherein $6 \leq a \leq 7$, $3 < b < 6$, $0 < c \leq 1$, $0 < d \leq 2$, and
each X is the same or different halogen atom selected from the group consisting of chlorine (Cl), bromine (Br), and iodine (I).

4 Claims, 14 Drawing Sheets

(51) Int. Cl.
  *C01B 25/10* (2006.01)
  *C01D 15/00* (2006.01)
  *H01M 10/052* (2010.01)
  *C04B 35/547* (2006.01)

(52) U.S. Cl.
  CPC ............ C01D 15/00 (2013.01); C04B 35/547 (2013.01); H01M 10/052 (2013.01); *C01P 2002/72* (2013.01); *C04B 2235/3203* (2013.01); *C04B 2235/3852* (2013.01); *C04B 2235/444* (2013.01); *C04B 2235/446* (2013.01); *C04B 2235/447* (2013.01); *C04B 2235/76* (2013.01); *C04B 2235/96* (2013.01); *H01M 2220/20* (2013.01); *H01M 2300/008* (2013.01)

(58) Field of Classification Search
  CPC ....... C01B 25/14; C01D 15/00; C04B 35/547; C01P 2002/72; B04B 2235/3203; B04B 2235/3852; B04B 2235/444; B04B 2235/446; B04B 2235/447; B04B 2235/96
  See application file for complete search history.

(56) References Cited

OTHER PUBLICATIONS

Fukushima et al., "Mechanochemical synthesis of high lithium ion conducting solid electrolytes in a $Li_2S$—$P_2S_5$—$Li_3N$ system", Solid State Ionics 304, 2017, 85-89.

* cited by examiner

NITROGEN-DOPED SULFIDE-BASED SOLID ELECTROLYTE FOR ALL-SOLID BATTERIES

CROSS-REFERENCE TO RELATED APPLICATION

This application claims, under 35 U.S.C. § 119(a), the benefit of priority to Korean Patent Application No. 10-2017-0181114 filed on Dec. 27, 2017, the entire contents of which are incorporated herein by reference.

TECHNICAL FIELD

The present invention relates to a nitrogen-doped sulfide-based solid electrolyte for all-solid batteries and an all-solid battery with improved electrochemical stability including the same.

BACKGROUND

Secondary batteries have been widely used in large devices such as automobiles and electric power storage systems and in small devices such as mobile phones, camcorders, laptop computers and the like.

As the application range of secondary batteries broadens, there is increasing demand for safe and highly functional batteries.

For example, lithium secondary batteries, which are one type of secondary battery, have advantages of high energy density and high capacity per unit area, compared to nickel-manganese batteries or nickel-cadmium batteries.

However, electrolytes conventionally used in lithium secondary batteries are liquid electrolytes such as organic solvents. Accordingly, safety problems such as leakage of electrolytes and risk of fire may continuously occur.

Recently, all-solid batteries including solid electrolytes, rather than liquid electrolytes have been used to improve the safety feature of the lithium secondary battery and have attracted much attention. For example, solid electrolytes are typically safer than liquid electrolytes due to non-combustible or flame retardant properties.

Solid electrolytes may include oxide-based solid electrolytes and sulfide-based solid electrolytes. Sulfide-based solid electrolytes have been generally used because they have higher lithium ionic conductivity range, compared to oxide-based solid electrolytes. However, sulfide-based solid electrolytes have a drawback of unstable operation of the batteries because they have lower chemical stability than oxide based solid electrolytes.

Thus, a variety of research has been underway to improve electrochemical stability of sulfide-based solid electrolytes, but essential physical properties such as ionic conductivity of solid electrolytes may have been disadvantageously deteriorated.

The above information disclosed in this Background section is provided only for enhancement of understanding of the background of the invention and therefore it may contain information that does not form the prior art that is already known in this country to a person of ordinary skill in the art.

SUMMARY OF THE INVENTION

In preferred aspects, the present invention provides a compound to improve electrochemical stability of sulfide-based solid electrolytes.

Further, the present invention provides a compound to improve electrochemical stability of sulfide-based solid electrolytes without impairing ionic conductivity thereof.

The objects of the present invention are not limited to those described above. The objects of the present invention will be clearly understood from the following description and could be implemented by means defined in the claims and a combination thereof.

In one aspect, the present invention provides a solid electrolyte ("nitrogen-doped sulfide-based solid electrolyte") for all-solid batteries comprising a compound represented by the following Formula 1:

$$Li_aPS_bN_cX_d \qquad \text{[Formula 1]}$$

wherein in Formula 1, $6 \leq a \leq 7$, $3 < b < 6$, $0 < c \leq 1$, $0 < d \leq 2$; and each X is the same or different halogen atom selected from the group consisting of chlorine (Cl), bromine (Br), and iodine (I). Preferably, the compound has argyrodite-type crystal structure.

The term "all-solid cell" or "all-solid battery" as used herein refers to a cell or a battery that includes only solid or substantially solid-state components, such as solid electrodes (e.g. anode and cathode) and solid electrolyte.

The term "nitrogen-doped sulfide-based solid electrolyte" as used herein refers to a solid electrolyte material that may include the nitrogen atoms substituting the sulfur atoms. For example, nitrogen atoms can substitute a portion of sulfur atoms in a crystal structure (e.g., argyrodite structure) of the solid electrolyte material. A portion of the nitrogen atoms may suitably be about 0.1%, about 1%, about 3%, about 5%, about 10%, about 20%, about 30%, about 40%, about 50%, about 60%, about 70%, about 80%, or about 90% of the total number of sulfur atoms in non-doped material.

The term "argyrodite crystal", "argyrodite crystal system" or "argyrodite-type crystal structure" as used herein refers to a crystal structure having a crystal structure or system similar to naturally existing $Ag_8GeS_6$, $Li_7PS_6$ (Argyrodite). The argyrodite crystal may be orthorhombic having Pna21 space group and having a unit cell of a=15.149, b=7.476, c=10.589 [Å]; Z=4. The argyrodite crystal also may empirically be determined for example, by X-ray diffraction spectroscopy by observing peaks around at $2\theta=15.5\pm1°$, $18\pm1°$, $26\pm1°$, $30.5\pm1°$, and $32\pm1°$.

The compound may be represented by the following Formula 2:

$$Li_{6+a}PS_{5-a}N_aX \qquad \text{[Formula 2]}$$

wherein in Formula 2, $0<a\leq 1$ and X is as defined above in Formula 1.

The compound may be represented by the following Formula 3.

$$Li_6PS_{5-1.5b}N_bX \qquad \text{[Formula 3]}$$

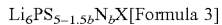

wherein in Formula 3, $0<b\leq 0.75$ and X is as defined above in Formula 1.

The compound may be represented by the following Formula 4:

$$Li_7PS_{6-2c}N_cX_c \qquad \text{[Formula 4]}$$

wherein in Formula 4, $0<c\leq 1$ and X is as defined above in Formula 1.

The compound may be represented by the following Formula 5:

$$Li_6PS_{5-2d}N_dX_{1+d} \qquad \text{[Formula 5]}$$

wherein in Formula 5, $0<d\leq 1$ and X is as defined above in Formula 1.

In another aspect, the present invention provides an all-solid battery including a cathode, an anode and a solid electrolyte layer interposed between the cathode and the anode. Preferably, at least one of the cathode, the anode and the solid electrolyte layer may include the solid electrolyte as disclosed herein.

In another aspect, the present invention provides a method of manufacturing a solid electrolyte for all-solid batteries including providing a mixture of $Li_2S$, $P_2S_5$, LiX (each X is the halogen atom selected from the group consisting of chlorine (Cl), bromine (Br), and iodine (I)) and $Li_3N$, grinding the mixture, and heat-treating the mixture to obtain a compound having an argyrodite-type crystal structure.

Preferably, the compound is represented by the following Formula 1:

$$Li_aPS_bN_cX_d \quad \text{[Formula 1]}$$

wherein in Formula 1, 6≤a≤7, 3<b<6, 0<c≤1, 0<d≤2; and each X is the same or different halogen atom selected from the group consisting of chlorine (Cl), bromine (Br), and iodine (I).

The compound may be represented by the following Formula 2:

$$Li_{6+a}PS_{5-a}N_aX \quad \text{[Formula 2]}$$

wherein in Formula 2, 0<a≤1 and X is as defined above in Formula 1.

The compound may be represented by the following Formula 3.

$$Li_6PS_{5-1.5b}N_bX \quad \text{[Formula 3]}$$

wherein in Formula 3, 0<b≤0.75 and X is as defined above in Formula 1.

The compound may be represented by the following Formula 4:

$$Li_7PS_{6-2c}N_cX_c \quad \text{[Formula 4]}$$

wherein in Formula 4, 0<c≤1 and X is as defined above in Formula 1.

The compound may be represented by the following Formula 5:

$$Li_6PS_{5-2d}N_dX_{1+d} \quad \text{[Formula 5]}$$

wherein in Formula 5, 0<d≤1 and X is as defined above in Formula 1.

Further provided is a vehicle that may include the all-solid battery as described herein.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

Figure 1:
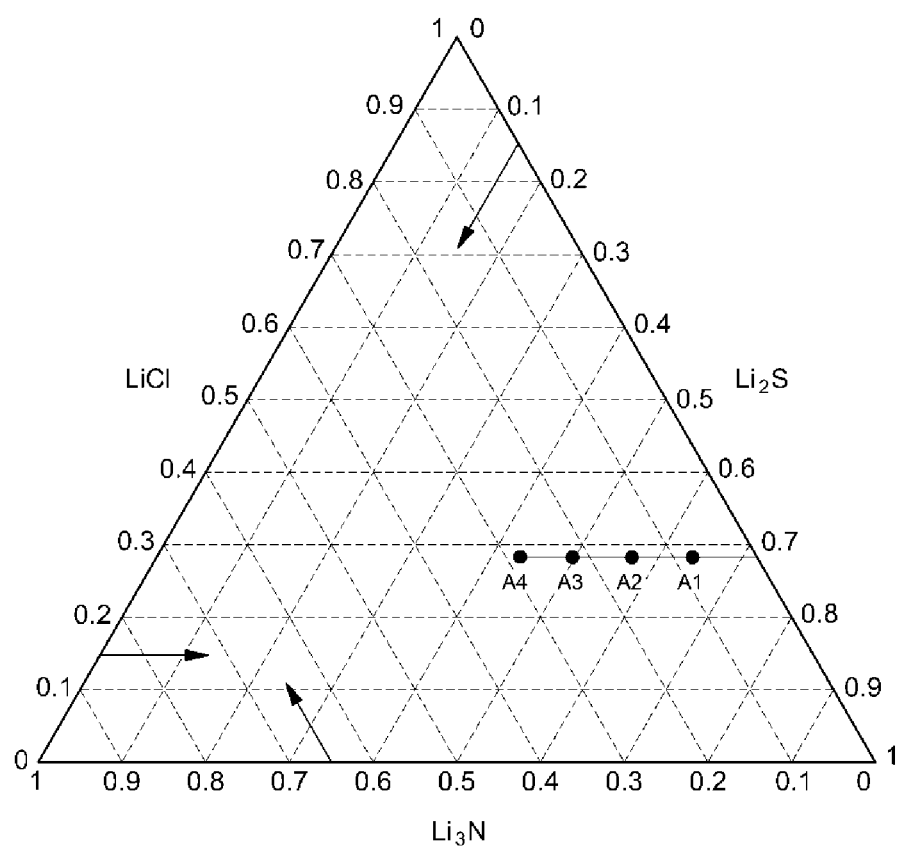
FIG. 1 shows an exemplary composition of sulfide-based solid electrolyte according to an exemplary embodiment of the present invention as a ternary system of $Li_2S$, LiCl and $Li_3N$ except $P_2S_5$ which is the fixed amount.

The objects described above, and other objects, features and advantages will be clearly understood from the following preferred embodiments with reference to the annexed drawings. However, the present invention is not limited to the embodiments and will be embodied in different forms. The embodiments are suggested only to offer thorough and complete understanding of the disclosed contents and sufficiently inform those skilled in the art of the technical concept of the present invention.

Like reference numbers refer to like elements throughout the description of the figures. In the drawings, the sizes of structures are exaggerated for clarity. It will be understood that, although the terms "first", "second", etc. may be used herein to describe various elements, these elements should not be limited by these terms and are used only to distinguish one element from another. For example, within the scope defined by the present invention, a first element may be referred to as a second element and similarly, a second element may be referred to as a first element. Singular forms are intended to include plural forms as well, unless context clearly indicates otherwise.

It will be further understood that the terms "comprises", "has" and the like, when used in this specification, specify the presence of stated features, number, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" modifies all the numbers, figures and/or expressions. In addition, when numerical ranges are disclosed in the description, these numerical ranges are continuous and include all numbers from the minimum to the maximum including the maximum within the ranges unless otherwise defined. Furthermore, when the range is referred to as an integer, it includes all integers from the minimum to the maximum including the maximum within the range, unless otherwise defined.

It should be understood that, in the specification, when the range is referred to regarding a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

In preferred aspects of the present invention, the nitrogen-doped sulfide-based solid electrolyte for all-solid batteries may include a compound represented by the following Formula 1.

$$Li_aPS_bN_cX_d$$ [Formula 1]

wherein, in Formula 1, $6 \leq a \leq 7$, $3 < b < 6$, $0 < c \leq 1$, $0 < d \leq 2$, and each X is the same or different halogen atom selected from the group consisting of chlorine (Cl), bromine (Br), and iodine (I).

In the related arts, it has been reported that improvement in properties of solid electrolytes may be obtained replacing a part of $Li_2S$ as a raw material by $Li_3N$ in the production of $75Li_2S-25P_2S_5$ of a crystal structure of glass ceramics.

However, the solid electrolyte basic structure in the related arts is based on a beta-$Li_3PS_4$ structure including an amorphous structure system. To the contrary, in one preferred aspect, the solid electrolyte may have an argyrodite crystalline structure system, which can secure high crystallinity of $Li_6PS_5Cl$ or $Li_7PS_6$.

In addition, the nitrogen atom may permeate into the amorphous network of the solid electrolyte. When the nitrogen atom is added in an increased amount, a new structure, rather than beta-$Li_3PS_4$, is formed. On the other hand, the crystal structure of the solid electrolyte according to the present invention retains the basic argyrodite structure and does not have $Li_3N$ residues regardless of the amount of nitrogen added. In other words, the crystal structure of the solid electrolyte may be doped with nitrogen atoms.

In addition, the solid electrolyte in the related arts may lose its crystal structure when 20 mol % or greater of $Li_3N$ is added thereto. On the other hand, the composition range of the solid electrolyte according to preferred embodiments of the present invention may keep the stable solid electrolyte crystal structure even at a high amount of $Li_3N$ substitution.

EXAMPLE

Hereinafter, preferred embodiments of the present invention will be described in more detail.

Example 1

According to an exemplary embodiment of the present invention, the sulfide-based solid electrolyte was a compound represented by the following Formula 2.

$$Li_{6+a}PS_{5-a}N_aX$$ [Formula 2]

wherein in Formula 2, $0 < a \leq 1$ and each X is the same or different halogen atom selected from the group consisting of chlorine (Cl), bromine (Br), and iodine (I)

The sulfide-based solid electrolyte was produced by providing a mixture of $Li_2S$, $P_2S_5$, LiX and $Li_3N$, grinding the mixture, and heat-treating the mixture.

LiX is lithium halide and is selected from the group consisting of lithium chloride (LiCl), lithium bromide (LiBr), lithium iodide (LiI) and a combination thereof, preferably, LiCl. Hereinafter, a description will be provided, based on LiCl as a representative starting material for convenience of illustration. In the present invention, LiX is not limited to LiCl.

By controlling a molar ratio of $Li_2S$, $P_2S_5$, LiCl and $Li_3N$, which are starting materials, the compound represented by Formula 2 may be obtained. For example, the mixture was provided by reducing the number of moles of $Li_2S$, corresponding to the number of moles of $Li_3N$ added.

In addition, Li$_2$S, P$_2$S$_5$, LiCl and Li$_3$N may be mixed by adjusting the molar ratio thereof to (37.5 to 56.25):12.5:25: (6.25 to 25).

The grinding of the mixture may be dry-grinding using a ball mill, a bead mill, a homogenizer or the like. The present invention is not limited to the grinding method and wet-grinding, which includes adding the mixture to a suitable solvent and grinding the mixture using a zirconia ball or the like, may be used. Grinding conditions such as grinding speed and time may be suitably changed according to production environments, devices and the like, and any conditions may be used for grinding so long as the mixture can be sufficiently ground and become amorphous.

The heat-treatment as used herein may crystallize the mixture, which has been ground and amorphous, by application of heat thereto. Any conditions can be used for heat-treatment so long as the mixture may be sufficiently crystallized, without deterioration. The heat-treatment is, for example, conducted at a temperature of about 400° C. to 600° C. for about 3 hours to 5 hours.

Production of Sulfide-Based Solid Electrolyte and Measurement of Ionic Conductivity Li$_2$S, P$_2$S$_5$, LiCl and Li$_3$N were weighed as starting materials in accordance with the composition shown in the following Table 1, mixed and then ground at 330 rpm for 24 hours by mechanical milling. The resulting product was heat-treated at a temperature of 550° C. for 5 hours to obtain a sulfide-based solid electrolyte.

The composition of the sulfide-based solid electrolyte is shown as a molar ratio of Li$_2$S, P$_2$S$_5$, LiCl and Li$_3$N, as indicated in Table 1 and is shown as a ternary system of Li$_2$S, LiCl and Li$_3$N in FIG. 1.

The ionic conductivity of the sulfide-based solid electrolyte was measured at room temperature (25° C.). Specifically, each sulfide-based solid electrolyte was compression-molded to form a molded product for testing (diameter of 13 mm, thickness of 1 to 1.5 mm). Ionic conductivity was measured by applying an alternating current of 10 mV to the molded product, conducting frequency sweep at 1×10$^6$ to 1 Hz, and measuring an impedance value. The results are shown in the following Table 1.

TABLE 1

| Type | Composition | Molar ratio of respective ingredients Li$_2$S:P$_2$S$_5$:LiCl:Li$_3$N | Ionic conductivity [mS/cm] |
|---|---|---|---|
| A-1 | Li$_{6.25}$PS$_{4.75}$N$_{0.25}$Cl | 56.25:12.5:25:6.25 | 1.60 |
| A-2 | Li$_{6.5}$PS$_{4.5}$N$_{0.5}$Cl | 50:12.5:25:12.5 | 2.03 |
| A-3 | Li$_{6.75}$PS$_{4.25}$N$_{0.75}$Cl | 43.75:12.5:25:18.75 | 1.57 |
| A-4 | Li$_7$PS$_4$NCl | 37.5:12.5:25:25 | 1.01 |
| Comparative Example | Li$_6$PS$_5$Cl | 62.5:12.5:25:0 | 1.14 |

As shown in Table 1, the sulfide-based solid electrolyte according to the present invention exhibited improved ionic conductivity, as compared to the conventional sulfide-based solid electrolyte according to Comparative Example. A-4 was shown to substantially retain ionic conductivity, since its ionic conductivity was slightly decreased, but this decrease was negligible.

X-Ray Diffraction (XRD) Analysis

Figure 2:
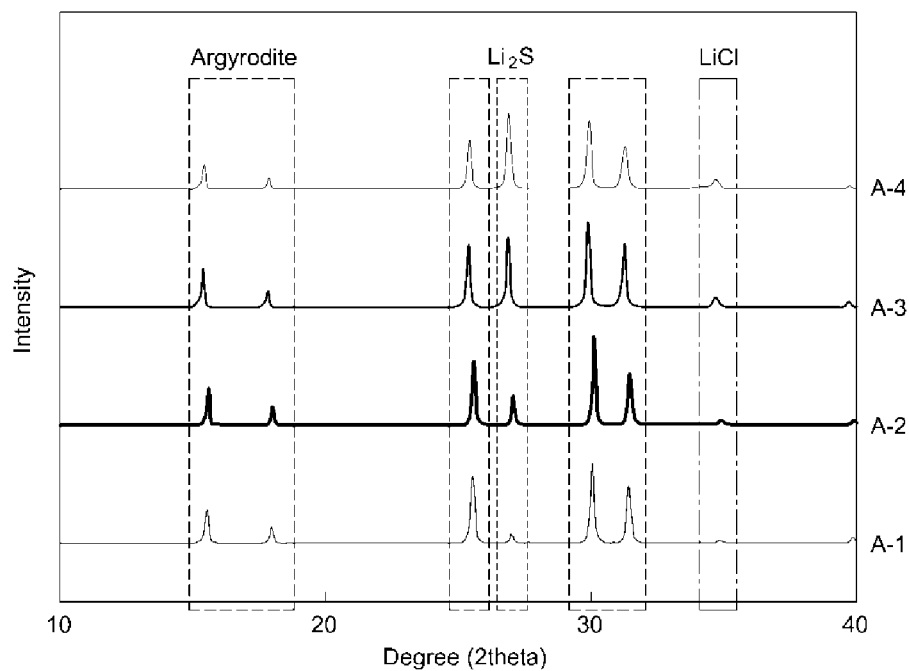
FIG. 2 shows an X-ray diffraction (XRD) analysis result of an exemplary sulfide-based solid electrolyte according to an exemplary embodiment of the present invention.

The sulfide-based solid electrolyte was subjected to XRD analysis to analyze the crystal structure thereof. The results are shown in FIG. 2. The sulfide-based solid electrolyte according to an exemplary embodiment of the present invention has an argyrodite-type crystal structure. In addition, although the amount of Li$_3$N added increased, peaks of Li$_3$N was not observed. This is due to the fact that there are no nitrogen residues, since the argyrodite-type crystal structure of the sulfide-based solid electrolyte is doped with the entirety of nitrogen.

In addition, as the amount of Li$_3$N added increased, the amount of remaining Li$_2$S increased and the crystallinity of the argyrodite-type crystal structure was deteriorated.

Example 2

According to another exemplary embodiment of the present invention, the sulfide-based solid electrolyte was a compound represented by the following Formula 3.

$$\text{Li}_6\text{PS}_{5-1.5b}\text{N}_b\text{X} \quad [\text{Formula 3}]$$

wherein in Formula 3, 0<b≤0.75 and each X is the same or different halogen atom selected from the group consisting of chlorine (Cl), bromine (Br), and iodine (I)

The sulfide-based solid electrolyte was produced by providing a mixture of Li$_2$S, P$_2$S$_5$, LiX and Li$_3$N, grinding the mixture, and heat-treating the mixture.

By controlling a molar ratio of Li$_2$S, P$_2$S$_5$, LiCl and Li$_3$N, the compound represented by Formula 3 may be obtained. For example, the mixture was obtained by substituting 2 moles (number of moles added) of Li$_3$N and 3 moles (number of moles subtracted) of Li$_2$S.

In addition, Li$_2$S, P$_2$S$_5$, LiCl and Li$_3$N can be mixed by adjusting the molar ratio thereof to (37.93 to 54.84):(12.9 to 13.79):(25.81 to 27.59):(6.45 to 20.69).

Other respective steps of the production method are the same in Example 1.

Production of Sulfide-Based Solid Electrolyte and Measurement of Ionic Conductivity Li$_2$S, P$_2$S$_5$, LiCl and Li$_3$N were weighed as starting materials in accordance with the composition shown in the following Table 2, mixed and then ground at 330 rpm for 24 hours by mechanical milling. The resulting product was heat-treated at a temperature of 550° C. for 5 hours to obtain a sulfide-based solid electrolyte.

Figure 3:
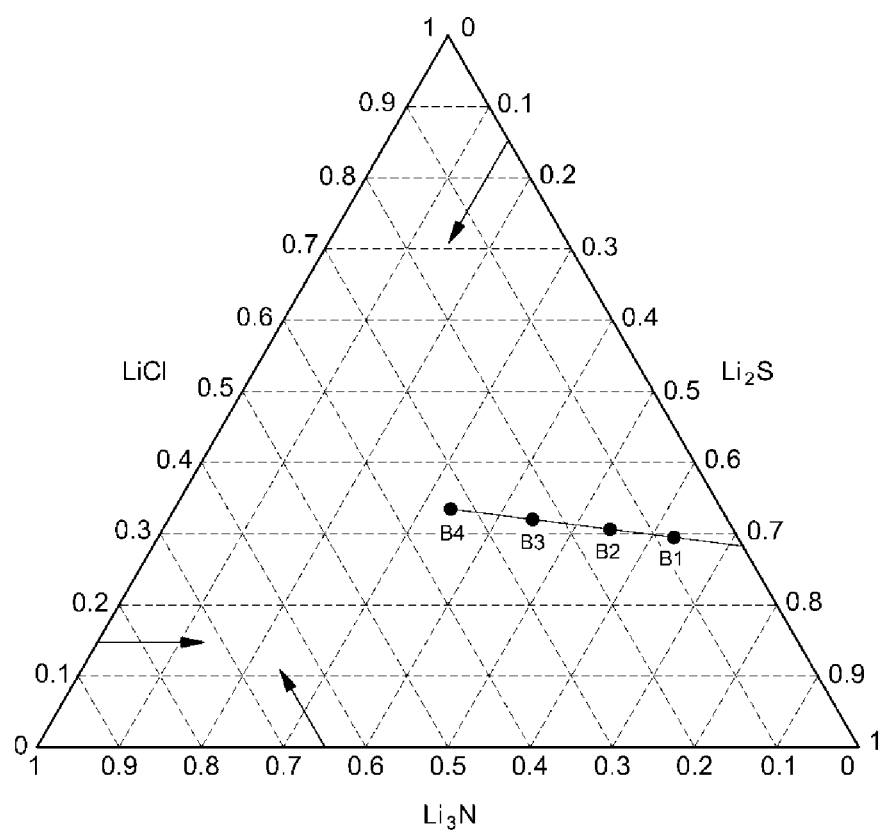
FIG. 3 shows an exemplary composition of an exemplary sulfide-based solid electrolyte according to an exemplary embodiment of the present invention as a ternary system of $Li_2S$, LiCl and $Li_3N$ in mole ratio.

The composition of the sulfide-based solid electrolyte is shown as a molar ratio of Li$_2$S, P$_2$S$_5$, LiCl and Li$_3$N in Table 2 and is shown as a ternary system of Li$_2$S, LiCl and Li$_3$N in FIG. 3.

The ionic conductivity of the sulfide-based solid electrolyte was measured at room temperature (25° C.). Specifically, each sulfide-based solid electrolyte was compression-molded to form a molded product for testing (diameter of 13 mm, thickness of 1 to 1.5 mm). The ionic conductivity was measured by applying an alternating current of 10 mV to the molded product, conducting frequency sweep at 1×10$^6$ to 1 Hz, and measuring an impedance value. The results are shown in the following Table 2.

TABLE 2

| Type | Composition | Molar ratio of respective ingredients Li$_2$S:P$_2$S$_5$:LiCl:Li$_3$N | Ionic conductivity [mS/cm] |
|---|---|---|---|
| B-1 | Li$_6$PS$_{4.625}$N$_{0.25}$Cl | 54.84:12.90:25.81:6.45 | 2.01 |
| B-2 | Li$_6$PS$_{4.25}$N$_{0.5}$Cl | 46.67:13.33:26.67:13.33 | 2.29 |
| B-3 | Li$_6$PS$_{3.875}$N$_{0.75}$Cl | 37.93:13.79:27.59:20.69 | 1.65 |
| Comparative Example 1 | Li$_6$PS$_{3.5}$NCl | 28.57:14.29:28.57:28.57 | 0.384 |
| Comparative Example 2 | Li$_6$PS$_5$Cl | 62.5:12.5:25:0 | 1.14 |

As shown in Table 2, the sulfide-based solid electrolyte according to the exemplary embodiment of the present invention exhibited improved ionic conductivity, as compared to the conventional sulfide-based solid electrolyte according to Comparative Example. $Li_6PS_{3.5}NCl$ containing a great amount of $Li_3N$ according to Comparative Example showed a great deterioration in ionic conductivity. Accordingly, this means that the suggested range of Example is suitable.

X-Ray Diffraction (XRD) Analysis

The sulfide-based solid electrolyte was subjected to XRD analysis to analyze the crystal structure thereof. The results are shown in FIG. 4.

Figure 4:
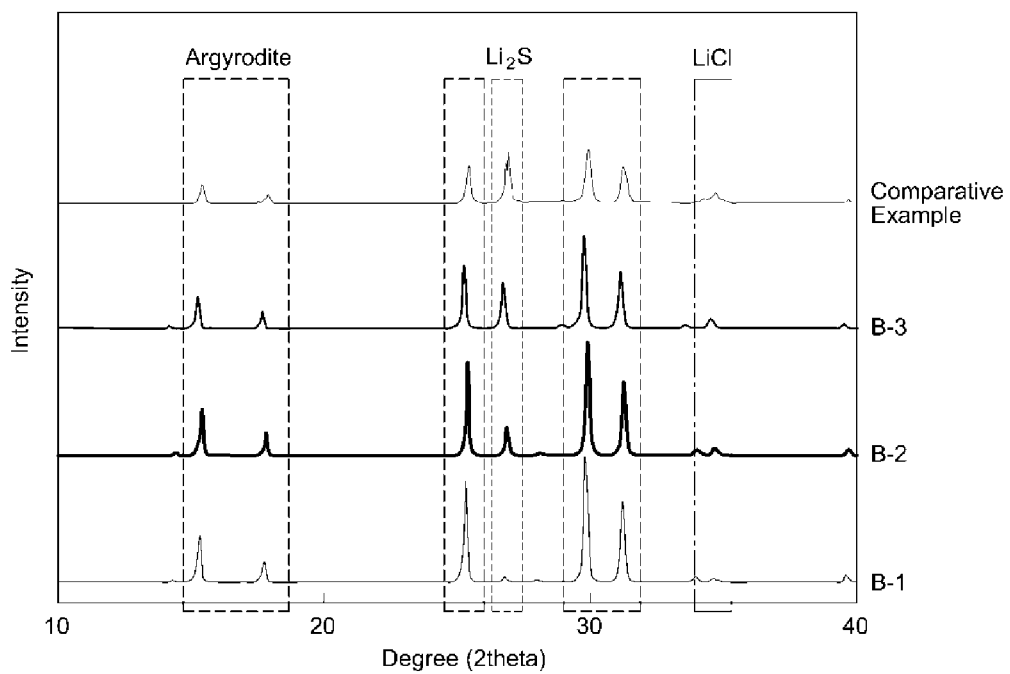
FIG. 4 shows an X-ray diffraction (XRD) analysis result of an exemplary sulfide-based solid electrolyte according to an exemplary embodiment of the present invention.

As shown in FIG. 4, the sulfide-based solid electrolyte according to the exemplary embodiment of the present invention has an argyrodite-type crystal structure. In addition, although the amount of $Li_3N$ added increases, peaks of $Li_3N$ were not observed. This is due to the fact that there were no $Li_3N$ residues, since the argyrodite-type crystal structure of the sulfide-based solid electrolyte is doped with the entirety of nitrogen.

In addition, as the amount of $Li_3N$ added increases, the remaining amount of $Li_2S$ increases and the crystallinity of the argyrodite-type crystal structure is deteriorated.

Example 3

According to another exemplary embodiment of the present invention, the sulfide-based solid electrolyte was a compound represented by the following Formula 4.

$Li_7PS_{6-2c}N_cX_c$      [Formula 4]

wherein in Formula 4, $0<c\leq1$ and each X is the same or different halogen atom selected from the group consisting of chlorine (Cl), bromine (Br), and iodine (I).

The sulfide-based solid electrolyte may be produced by providing a mixture of $Li_2S$, $P_2S_5$, LiCl and $Li_3N$, grinding the mixture, and heat-treating the mixture.

By controlling a molar ratio of $Li_2S$, $P_2S_5$, LiCl and $Li_3N$, the compound represented by Formula 4 was obtained. Specifically, the mixture was obtained by reducing the number of moles $Li_2S$, corresponding to a sum of the numbers of moles of $Li_3N$ and LiCl added, based on the molar ratio of $Li_2S$ and $P_2S_5$ for synthesizing $Li_7PS_6$.

In addition, $Li_2S$, $P_2S_5$, LiCl and $Li_3N$ may be mixed by adjusting the molar ratio thereof to (37.5 to 75):12.5:(6.25 to 25):(6.25 to 25).

Other respective steps of the production method are the same as Example 1.

Production of Sulfide-Based Solid Electrolyte and Measurement of Ionic Conductivity $Li_2S$, $P_2S_5$, LiCl and $Li_3N$ were weighed as starting materials in accordance with the composition shown in the following Table 3, mixed and then ground at 330 rpm for 24 hours by mechanical milling. The resulting product was heat-treated at a temperature of 550° C. for 5 hours to obtain a sulfide-based solid electrolyte.

Figure 5:
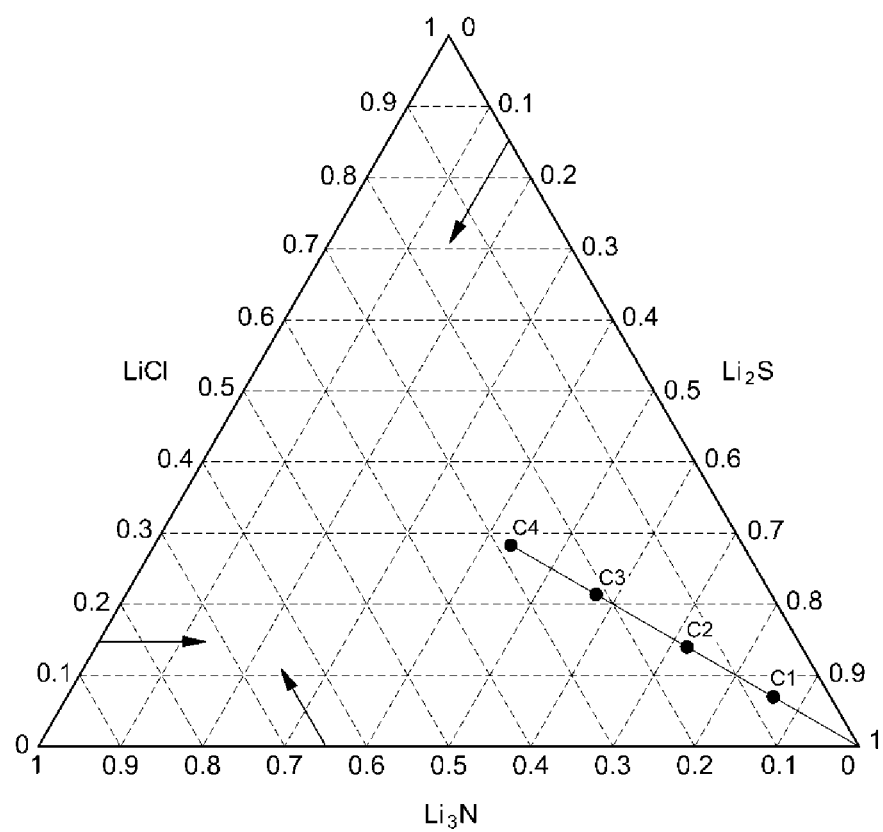
FIG. 5 shows an exemplary composition of an exemplary sulfide-based solid electrolyte according to an exemplary embodiment of the present invention as a ternary system of $Li_2S$, LiCl and $Li_3N$ in mole ratio.

The composition of the sulfide-based solid electrolyte is shown as a molar ratio of $Li_2S$, $P_2S_5$, LiCl and $Li_3N$ in Table 3 and is shown as a ternary system of $Li_2S$, LiCl and $Li_3N$ in FIG. 5.

The ionic conductivity of the sulfide-based solid electrolyte was measured at room temperature (25° C.). Specifically, each sulfide-based solid electrolyte was compression-molded to form a molded product for testing (diameter of 13 mm, thickness of 1 to 1.5 mm). The ionic conductivity was measured by applying an alternating current of 10 mV to the molded product, conducting frequency sweep at $1\times10^6$ to 1 Hz, and measuring an impedance value. The results are shown in the following Table 3.

TABLE 3

| Type | Composition | Molar ratio of respective ingredients $Li_2S:P_2S_5:LiCl:Li_3N$ | Ionic conductivity [mS/cm] |
|---|---|---|---|
| C-1 | $Li_7PS_{5.5}N_{0.25}Cl_{0.25}$ | 75:12.5:6.25:6.25 | 1.17 |
| C-2 | $Li_7PS_5N_{0.5}Cl_{0.5}$ | 62.5:12.5:12.5:12.5 | 1.70 |
| C-3 | $Li_7PS_{4.5}N_{0.75}Cl_{0.75}$ | 50:12.5:18.75:18.75 | 1.21 |
| C-4 | $Li_7PS_4NCl$ | 37.5:12.5:25:25 | 1.01 |
| Comparative Example | $Li_6PS_5Cl$ | 62.5:12.5:25:0 | 1.14 |

As shown in Table 3, the sulfide-based solid electrolyte according to the exemplary embodiment of the present invention exhibited improved ionic conductivity, as compared to the conventional sulfide-based solid electrolyte according to Comparative Example. C-4 was shown to substantially retain ionic conductivity, since its ionic conductivity was slightly decreased, but this decrease was negligible.

X-Ray Diffraction (XRD) Analysis

Figure 6:
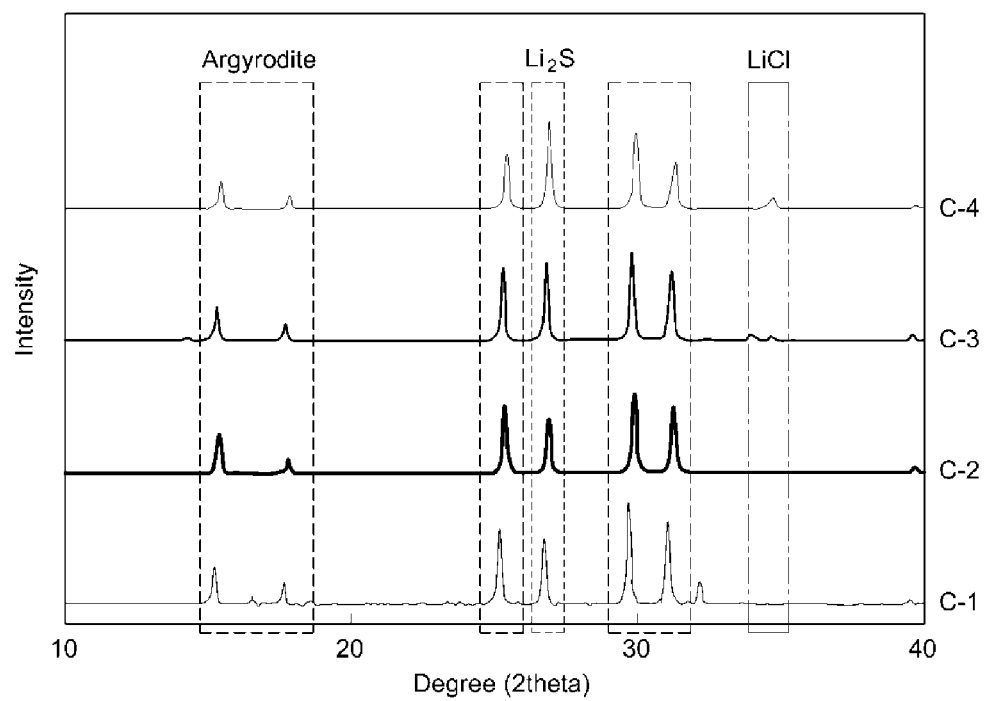
FIG. 6 shows an X-ray diffraction (XRD) analysis result of an exemplary sulfide-based solid electrolyte according to an exemplary embodiment of the present invention.

The sulfide-based solid electrolyte was subjected to XRD analysis to analyze the crystal structure thereof. The results are shown in FIG. 6. The sulfide-based solid electrolyte according to the exemplary embodiment of the present invention had an argyrodite crystal structure. In addition, although the amount of $Li_3N$ added increased, peaks of $Li_3N$ were not observed. This is due to the fact that there were no $Li_3N$ residues, since the argyrodite-type crystal structure of the sulfide-based solid electrolyte was doped with the entirety of nitrogen.

In addition, as the amount of $Li_3N$ added increased, the remaining amount of $Li_2S$ and LiCl increased and the crystallinity of the argyrodite-type crystal structure was deteriorated.

Example 4

According to another exemplary embodiment of the present invention, the sulfide-based solid electrolyte was a compound represented by the following Formula 5.

$Li_6PS_{5-2d}N_dX_{1+d}$      [Formula 5]

wherein in Formula 5, $0<d\leq1$ and each X is the same or different halogen atom selected from the group consisting of chlorine (Cl), bromine (Br), and iodine (I).

The sulfide-based solid electrolyte was produced by providing a mixture of $Li_2S$, $P_2S_5$, LiCl and $Li_3N$, grinding the mixture, and heat-treating the mixture.

By controlling a molar ratio of $Li_2S$, $P_2S_5$, LiCl and $Li_3N$, the compound represented by Formula 5 was obtained. Specifically, the mixture was obtained by reducing the number of moles of $Li_2S$, corresponding to a sum of the numbers of moles of $Li_3N$ and LiCl added, based on the molar ratio of $Li_2S$, $P_2S_5$ and LiCl for synthesizing $Li_6PS_5Cl$.

In addition, $Li_2S$, $P_2S_5$, LiCl and $Li_3N$ may be mixed by adjusting the molar ratio thereof to (12.5 to 50):12.5:(31.25 to 50):(6.25 to 25).

Other respective steps of the production method are the same as Example 1.

Production of Sulfide-Based Solid Electrolyte and Measurement of Ionic Conductivity Li$_2$S, P$_2$S$_5$, LiCl and Li$_3$N were weighed as starting materials in accordance with the composition shown in the following Table 4, mixed, and ground at 330 rpm for 24 hours by mechanical milling. The resulting product was heat-treated at a temperature of 550° C. for 5 hours to obtain a sulfide-based solid electrolyte.

Figure 7:
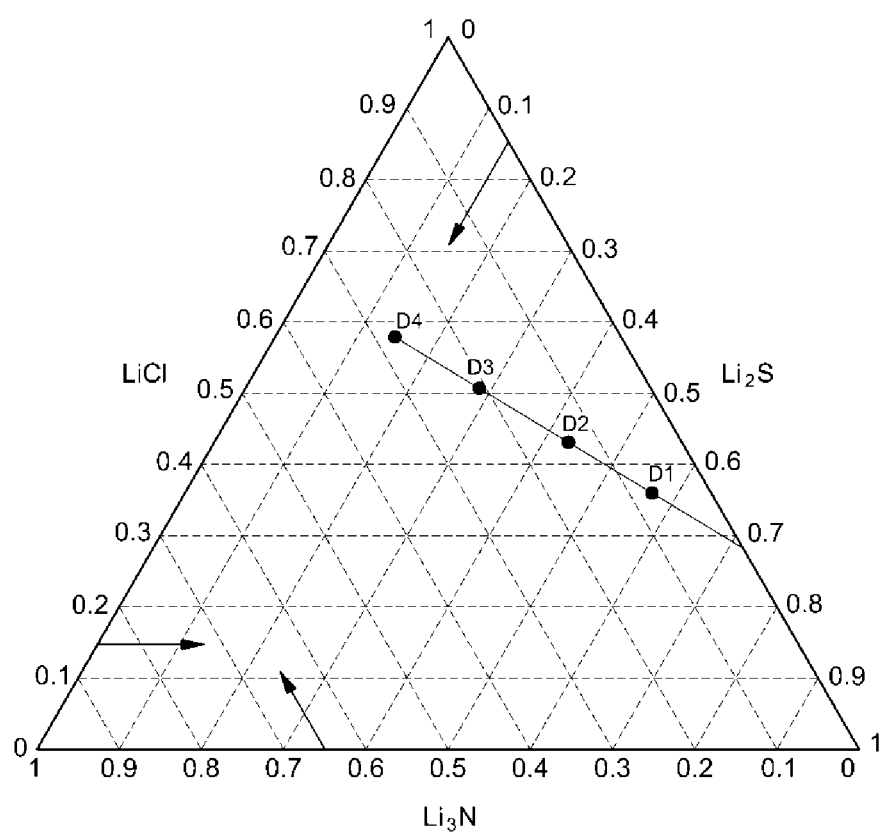
FIG. 7 shows an exemplary composition of an exemplary sulfide-based solid electrolyte according to an exemplary embodiment of the present invention as a ternary system of $Li_2S$, LiCl and $Li_3N$ in mole ratio.

The composition of the sulfide-based solid electrolyte is shown as a molar ratio of Li$_2$S, P$_2$S$_5$, LiCl and Li$_3$N in Table 4 and is shown as a ternary system of Li$_2$S, LiCl and Li$_3$N in FIG. 7.

The ionic conductivity of the sulfide-based solid electrolyte was measured at room temperature (25° C.). Specifically, each sulfide-based solid electrolyte was compression-molded to form a molded product for testing (diameter of 13 mm, thickness of 1 to 1.5 mm). The ionic conductivity was measured by applying an alternating current of 10 mV to the molded product, conducting frequency sweep at 1×10$^6$ to 1 Hz, and measuring an impedance value. The results are shown in the following Table 4.

TABLE 4

| Type | Composition | Molar ratio of respective ingredients Li$_2$S:P$_2$S$_5$:LiCl:Li$_3$N | Ionic conductivity [mS/cm] |
|---|---|---|---|
| D-1 | Li$_6$PS$_{4.5}$N$_{0.25}$Cl$_{1.25}$ | 50:12.5:31.25:6.25 | 1.85 |
| D-2 | Li$_6$PS$_4$N$_{0.5}$Cl$_{1.5}$ | 37.5:12.5:37.5:12.5 | 1.63 |
| D-3 | Li$_6$PS$_{3.5}$N$_{0.75}$Cl$_{1.75}$ | 25:12.5:43.75:18.75 | 1.43 |
| D-4 | Li$_6$PS$_3$NCl$_2$ | 12.5:12.5:50:25 | 0.889 |
| Comparative Example | Li$_6$PS$_5$Cl | 62.5:12.5:25:0 | 1.14 |

As shown in Table 4, the sulfide-based solid electrolyte according to the present invention exhibited improved ionic conductivity, as compared to the conventional sulfide-based solid electrolyte according to Comparative Example. D-4 was shown to substantially retain ionic conductivity, since its ionic conductivity was slightly decreased, but this decrease was negligible.

X-Ray Diffraction (XRD) Analysis

Figure 8:
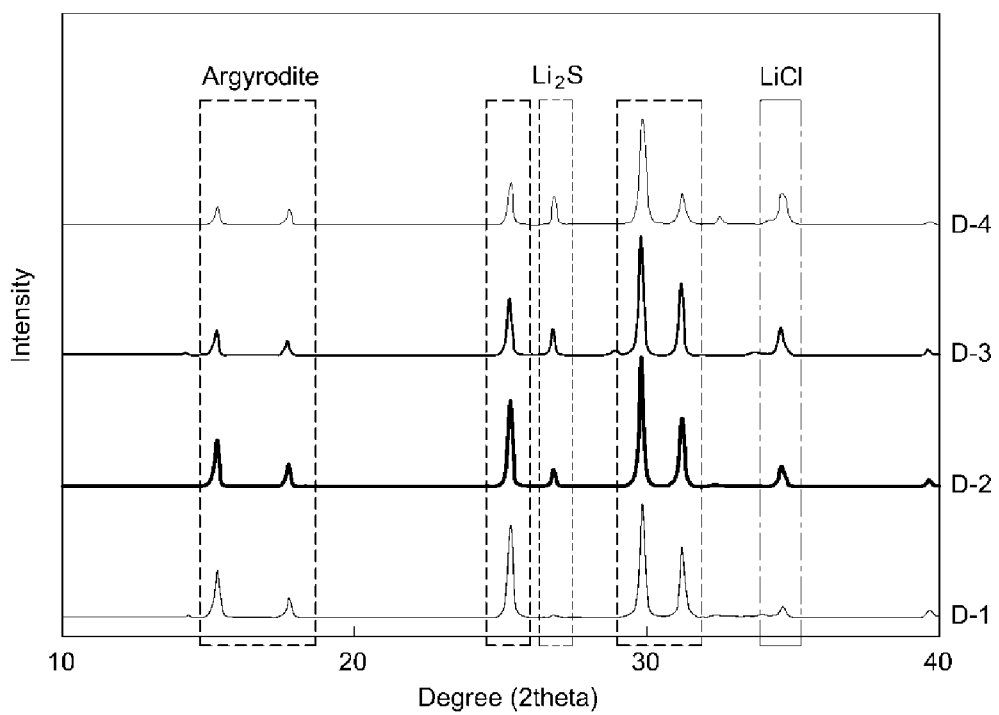
FIG. 8 shows an X-ray diffraction (XRD) analysis result of an exemplary sulfide-based solid electrolyte according to an exemplary embodiment of the present invention.

The sulfide-based solid electrolyte was subjected to XRD analysis to analyze the crystal structure thereof. The results are shown in FIG. 8. The sulfide-based solid electrolyte according to the exemplary embodiment of the present invention had an argyrodite-type crystal structure. In addition, although the amount of Li$_3$N added increases, peaks of Li$_3$N were not observed. This is due to the fact that there were no Li$_3$N residues, since the argyrodite-type crystal structure of the sulfide-based solid electrolyte was doped with the entirety of nitrogen.

In addition, as the amount of Li$_3$N added increased, the remaining amount of Li$_2$S and LiCl increased and the crystallinity of the argyrodite-type crystal structure was deteriorated.

Example 5: Ionic Conductivity

The ionic conductivities of the various exemplary sulfide-based solid electrolytes in Examples 1-4 were analyzed.

Figure 9:
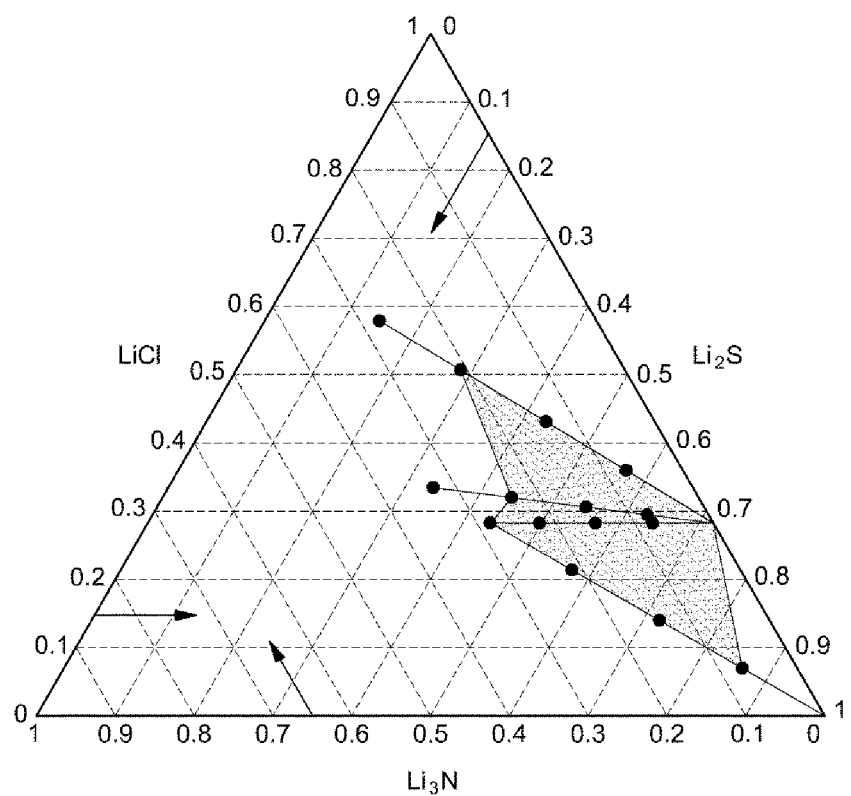
FIG. 9 shows a region of an exemplary composition showing ionic conductivity of 1.0 mS/cm or more in an exemplary sulfide-based solid electrolyte according to the present invention.

As shown in Tables 1 to 4, the sulfide-based solid electrolytes which have the compositions of A-1 to A-4, B-1 to B-3, C-1 to C-4 and D-1 to D-3 showed ionic conductivity of 1.0 mS/cm or greater, and the areas of compositions corresponding to the sulfide-based solid electrolytes are shown in FIG. 9.

Figure 10:
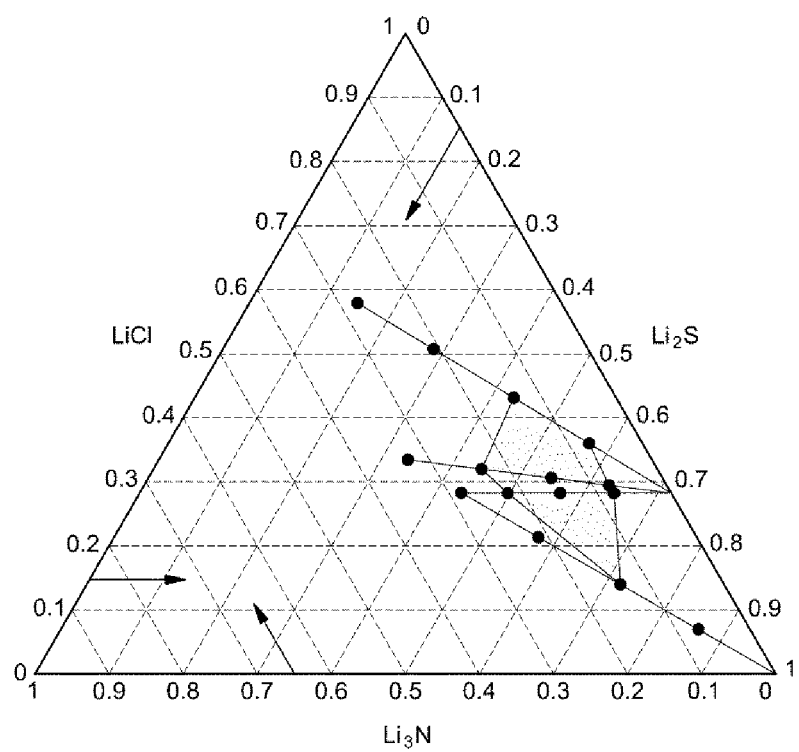
FIG. 10 shows a region of an exemplary composition showing ionic conductivity of 1.5 mS/cm or more in an exemplary sulfide-based solid electrolyte according to an exemplary embodiment of the present invention.

In addition, the sulfide-based solid electrolytes which have the compositions of A-1 to A-3, B-1 to B-3, C-2 and D-1 to D-2 showed ionic conductivity of 1.5 mS/cm or greater, and the areas of compositions corresponding to the sulfide-based solid electrolytes are shown in FIG. 10.

Figure 11:
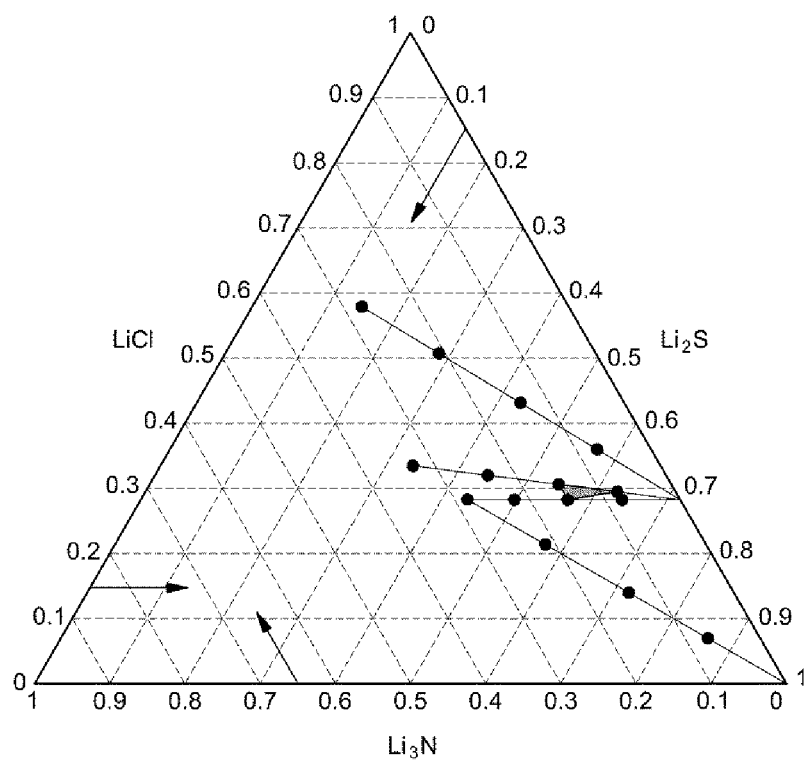
FIG. 11 shows a region of an exemplary composition showing ionic conductivity of 2.0 mS/cm or more in an exemplary sulfide-based solid electrolyte according to an exemplary embodiment of the present invention.

In addition, the sulfide-based solid electrolytes which have the compositions of A-2, and B-1 to B-2 showed ionic conductivity of 2.0 mS/cm or greater, and the areas of compositions corresponding to the sulfide-based solid electrolytes are shown in FIG. 11.

Example 6: Electrochemical Stability Test

The sulfide-based solid electrolytes in Examples 1-4 were subjected to cyclic voltammogram testing to evaluate safety when the sulfide-based solid electrolytes according to various exemplary embodiments of the present invention were applied to all-solid batteries.

Figure 12:
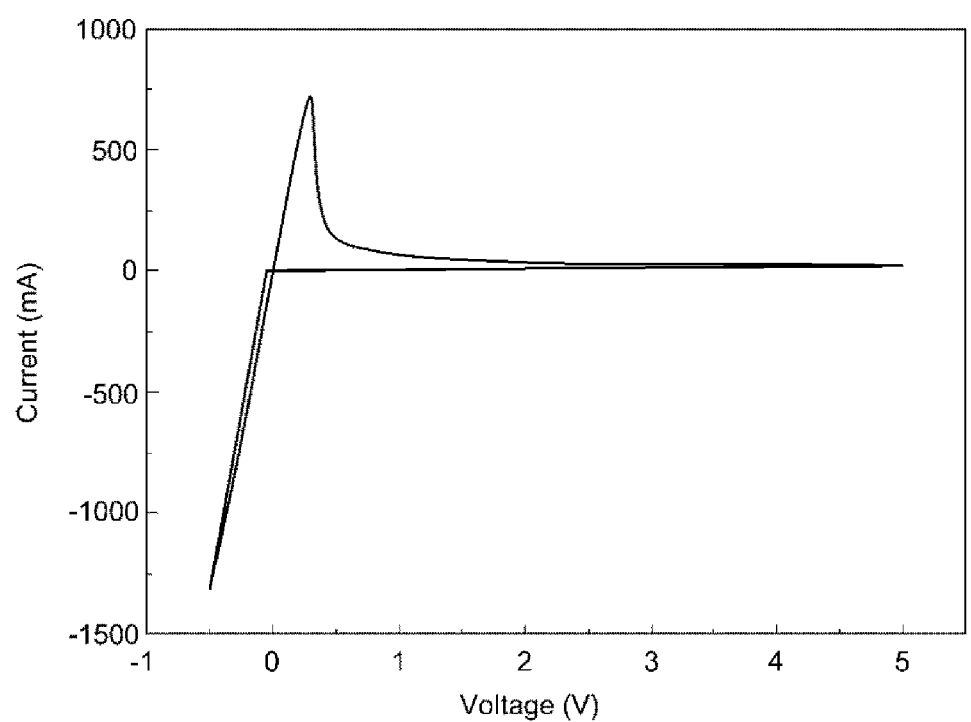
FIG. 12 shows a cyclic voltammogram test result of an exemplary sulfide-based solid electrolyte ($Li_6PS_{4.25}N_{0.5}Cl$) according to an exemplary embodiment of the present invention.

Specifically, a specimen was produced from the sulfide-based solid electrolyte having the composition of B-2, a lithium metal was attached to one surface of the specimen, and measurement was conducted within a voltage range of −0.5V to 5V upon application of a current of 20 mV/s. Results are shown in FIG. 12. The cyclic voltammogram of the nitrogen-doped sulfide-based solid electrolyte according to various exemplary embodiments of the present invention showed a very clear shape. This means that electrochemical reaction may be suppressed on a contact surface due to improved electrochemical stability of lithium metal.

When the sulfide-based solid electrolyte according to the present invention is applied to an all-solid battery, especially, as a solid electrolyte layer which contacts the anode, performance of all-solid battery may be substantially improved due to high electrochemical stability of the lithium metal (anode).

Example 7: Cell Test

Whether an all-solid battery, to which the sulfide-based solid electrolyte according to the present invention was applied, would be normally operated was checked.

Specifically, 0.2 g of the sulfide-based solid electrolyte having the composition of A-2 was pelletized into a mold with a size of 160, to form a solid electrolyte layer. 0.02 g of a powder including 70 wt % of LiNi$_{0.6}$Co$_{0.2}$Mn$_{0.2}$O$_2$ as an electrode active material, 28 wt % of the sulfide-based solid electrolyte and 2 wt % of a conductive material (Super-p) was compression-molded on one surface of the solid electrolyte layer to form a composite cathode. An indium foil was attached to the other surface of the solid electrolyte layer to form an anode. The completed all-solid battery was subjected to charge/discharge test under the condition of 0.1C rate in the range of 3.0V to 4.3V (versus Li). Results are shown in FIG. 13A.

An all-solid battery was produced using the sulfide-based solid electrolyte having the composition of B-2 in the same manner as above and was subjected to testing. Results are shown in FIG. 13B.

Figure 13A:
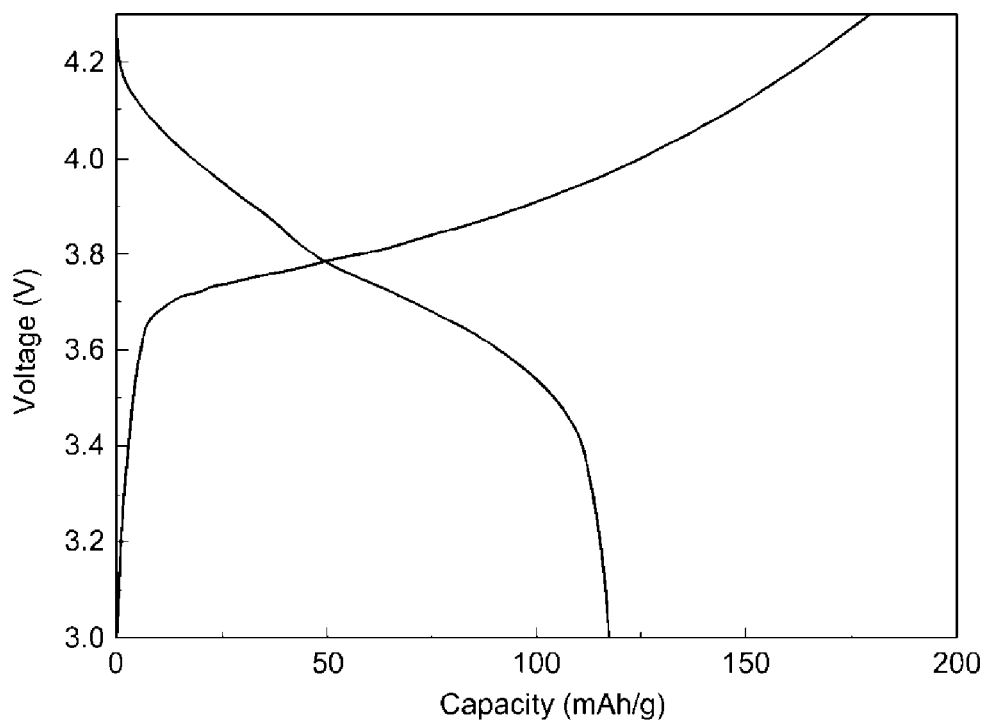
FIG. 13A shows a charge/discharge test result of an exemplary sulfide-based solid electrolyte ($Li_{6.5}PS_{4.5}N_{0.5}Cl$) according to an exemplary embodiment of the present invention.
Figure 13B:
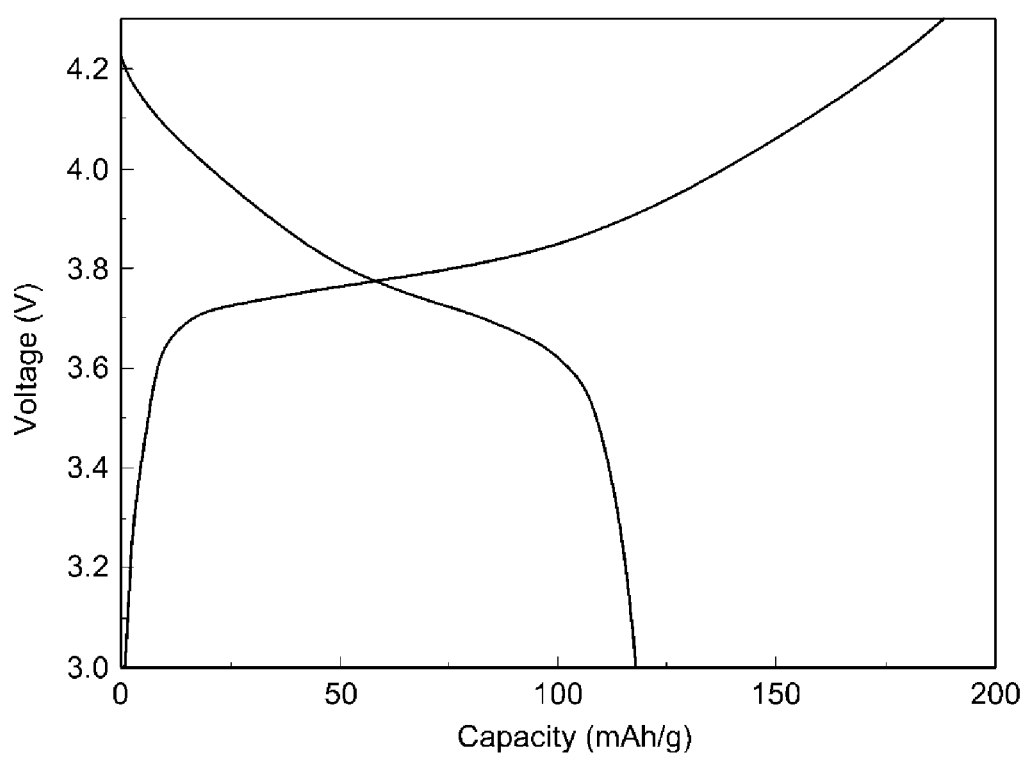
FIG. 13B shows a charge/discharge test result of an exemplary sulfide-based solid electrolyte ($Li_6PS_{4.25}N_{0.5}Cl$) according to an exemplary embodiment of the present invention.

As shown in FIGS. 13A and 13B, the all-solid battery, to which the sulfide-based solid electrolyte according to the exemplary embodiment of the present invention was applied, was normally charged/discharged and had a high discharge capacity of about 117 to 118mAh/g.

According to the present invention, the ionic conductivity of the sulfide-based solid electrolyte may be maintained, and at the same time, electrochemical stability thereof may be improved. As a result, when applying the solid electrolyte to an all-solid battery, battery safety may be greatly improved.

Other effects of the invention are discussed infra.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A solid electrolyte for all-solid batteries comprising:
a compound represented by the following Formula 3:

$$Li_6PS_{5-1.5b}N_bX \quad [\text{Formula 3}]$$

wherein in Formula 3, $0.5 \leq b \leq 0.75$; and
each X is the same or different halogen atom selected from the group consisting of chlorine (Cl), bromine (Br), and iodine (I),
wherein the compound has an argyrodite-type crystal structure.

2. An all-solid battery comprising:
a cathode;
an anode; and
a solid electrolyte layer interposed between the cathode and the anode,
wherein at least one of the cathode, the anode and the solid electrolyte layer comprises a solid electrolyte of claim 1.

3. A method of manufacturing a solid electrolyte for all-solid batteries comprising:
providing a mixture of $Li_2S$, $P_2S_5$, LiX and $Li_3N$;
grinding the mixture;
and heat-treating the mixture to obtain a compound having an argyrodite-type crystal structure,
wherein the compound is represented by the following Formula 3:

$$Li_6PS_{5-1.5b}N_bX \quad [\text{Formula 3}]$$

wherein in Formula 3, $0.5 \leq b \leq 0.75$;
wherein each X is the same or different halogen atom selected from the group consisting of chlorine (Cl), bromine (Br), and iodine (I).

4. A vehicle comprising an all-solid battery of claim 2.

* * * * *